United States Patent
Ho

(10) Patent No.: US 7,145,951 B2
(45) Date of Patent: Dec. 5, 2006

(54) METHOD AND RELATED APPARATUS FOR MOTION ESTIMATION

(75) Inventor: Cheng-Tsai Ho, Tai-Chung (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 184 days.

(21) Appl. No.: 10/904,421

(22) Filed: Nov. 9, 2004

(65) Prior Publication Data
US 2005/0100096 A1    May 12, 2005

(30) Foreign Application Priority Data
Nov. 11, 2003 (TW) .............................. 92131565 A

(51) Int. Cl.
*H04B 1/66* (2006.01)
*H04N 7/12* (2006.01)

(52) U.S. Cl. ................................. 375/240.16

(58) Field of Classification Search ............... None
See application file for complete search history.

(56) References Cited

U.S. PATENT DOCUMENTS

| 5,847,776 A | | 12/1998 | Khmelnitsky et al. |
| 6,014,181 A | * | 1/2000 | Sun ........................ 348/699 |
| 6,418,166 B1 | | 7/2002 | Wu et al. |
| 7,072,399 B1 | * | 7/2006 | Winger et al. ......... 375/240.16 |

* cited by examiner

*Primary Examiner*—Paul Huber
(74) *Attorney, Agent, or Firm*—Winston Hsu

(57) ABSTRACT

A method and related apparatus for motion estimation in a video compression system uses a cost function different from that of the prior art to determine an optimal motion vector for a current encoding block. The cost function takes into account, not only the conventional sum of absolute differences, but also the quantization step and the variation of pixel differences between the current encoding block and a block in a search range in a target picture. Using the disclosed cost function, the result residual corresponding to the optimal motion vector can be better compressed than that of other candidate motion vectors.

9 Claims, 2 Drawing Sheets

METHOD AND RELATED APPARATUS FOR MOTION ESTIMATION

BACKGROUND OF INVENTION

1. Field of the Invention

The invention relates to a method and related apparatus for motion estimation in a video compression system, and more particularly, to a method and related apparatus for motion estimation using a cost function.

2. Description of the Prior Art

As multimedia technology develops, more and more standards related to video compression have been introduced. For instance, various versions of MPEG are standards for digital video compression, and ITU H.261, H.263, ISO 10918 are other examples.

MPEG defines a standard for digital video compression. A motion picture is composed of a series of pictures, and each picture can be regarded as a two-dimensional array composed of a plurality of pixels, which is called a frame of the motion picture. MPEG standard defines four types of different pictures: I picture, which is encoded without referring to any other pictures; P picture, which is encoded through motion estimation referring to a previous I picture or P picture; B picture, which is encoded through motion estimation referring to a following I picture or P picture; and D picture, which is used in fast forward search mode.

Video compression systems complying with the standards mentioned above utilize motion estimation technology based on blocks or macroblocks in order to reduce the temporal redundancy. During motion estimation, for a current encoding block in a current picture, the video compression system will find a best matching block, which is the most similar to the current encoding block, from a target picture. In this case, for the current encoding block, the video compression system can store (or transmit) the motion vector and the residual calculated to represent data included in the current encoding block (wherein the residual represents a pixel value difference between the current encoding block and the best matching block).

According to the prior art, when the video compression system searches for the best matching block from a search range, a cost function called "sum of absolute difference" is used, which is obtained as follows:

$$SAD(x, y) = \sum_{i=i0}^{i1} \sum_{j=j0}^{j1} |C_{i,j} - P_{i+x,j+y}|$$

(x, y) is a candidate motion vector in the search range, (i1−i0)*(j1−j0) is the size of the current encoding block, $C_{ij}$ is a pixel in the current encoding block, and $P_{i+x,j+y}$ is a pixel in the search range of the target picture.

The conventional video compression system finds a candidate motion vector (x, y), which minimizes the cost function, to be the optimal motion vector (x1, y1) of the current encoding block. Such a method is for finding the best matching block having the smallest residual so that the residual can be better compressed. However, the found optimal motion vector (x1, y1) may not result in better compression; thus U.S. Pat. No. 5,847,776 discloses another cost function that considers not only the sum of absolute difference but also the volume of the motion vector during the searching for the optimal motion vector so that a balance can be kept between the found optimal motion vector and a residual corresponding to it.

However, most video compression systems utilize a discrete cosine transform (DCT) algorithm to transform the residual in a spatial domain into a frequency domain during the compressing of the residual. Then the video compression system utilizes a corresponding quantization matrix and a quantization step Qp, which changes according to a bit rate selected by the system, to quantize the residual in the frequency domain. Since the quantized matrix is a two-dimensional matrix, the system further utilizes zig-zag scan or alternate scan to scan the quantized two-dimensional data into one-dimensional data. Finally, the video compression system operates variable length coding.

During variable length coding, the smaller the frequency distribution range of the residual in the frequency domain is, the shorter the code length of the encoded residual is (i.e. the better compressed the residual is). However, neither the prior art nor the method disclosed in U.S. Pat. No. 5,847,776 can find the best matching block with the residual that has the smallest frequency distribution range. Even in the case that the found best matching block results in a residual in the spatial domain having the smallest sum of absolute difference, after it has been operated on by DCT, quantization process, zig-zag scan (or other scan methods), variable length coding, the residual may not necessarily have the shortest code length, meaning that the optimal compression cannot be achieved. This is a main problem in the prior art.

SUMMARY OF INVENTION

It is therefore a primary objective of the claimed invention to provide a method and related apparatus utilizing a cost function different from the prior art in order to solve the problems mentioned above.

Briefly, a motion estimation method used in a video compression system, dividing a current picture into a plurality of blocks, includes stepping through a plurality of candidate motion vectors (x, y) in a search range for a current encoding block in the current picture, wherein the current encoding block includes (i1−i0)*(j1−j0) pixels; calculating a cost function for each candidate motion vector (x, y) as follows, wherein $C_{ij}$ is a pixel in the current encoding block, $P_{i+x,j+y}$ is a pixel in the search range of a target picture, and Qp is a quantization step, $$CF(x, y) = \sum_{i=i0}^{i1} \sum_{j=j0}^{j1} \{|C_{i,j} - P_{i+x,j+y}| + h(Qp, C_{i,j}, P_{i+x,j+y})\};$$

and determining the candidate motion vector (x, y) in the search range that minimizes the cost function to be an optimal motion vector (x1, y1) of the current encoding block.

The present invention further provides a motion estimation device used in a video compression system, which divides a current picture into a plurality of blocks. The device steps through a plurality of candidate motion vectors (x, y) in a search range for a current encoding block in the current picture, wherein the current encoding block includes (i1−i0)*(j1−j0) pixels. The device includes an absolute difference calculator for calculating $|C_{i,j}-P_{i+x,j+y}|$, wherein $C_{ij}$ is a pixel in the current encoding block, and $P_{i+x,j+y}$ is a pixel in the search range of a target picture; a spatial variation calculating module for calculating function $h(Qp, C_{i,j}, P_{i+x,j+y})$ wherein Qp is a quantization step; and a motion vector determining module coupled with the absolute difference calculator and the spatial variation calculating module for calculating a cost function as follows, and determining the candidate motion vector (x, y) in the search range that minimizes the cost function to be an optimal motion vector (x1, y1) of the current encoding block:

$$CF(x, y) = \sum_{i=i0}^{i1} \sum_{j=j0}^{j1} \{|C_{i,j} - P_{i+x,j+y}| + h(Qp, C_{i,j}, P_{i+x,j+y})\}$$

These and other objectives of the present invention will no doubt become obvious to those of ordinary skill in the art after reading the following detailed description of the preferred embodiment that is illustrated in the various figures and drawings.

DETAILED DESCRIPTION

Figure 1:
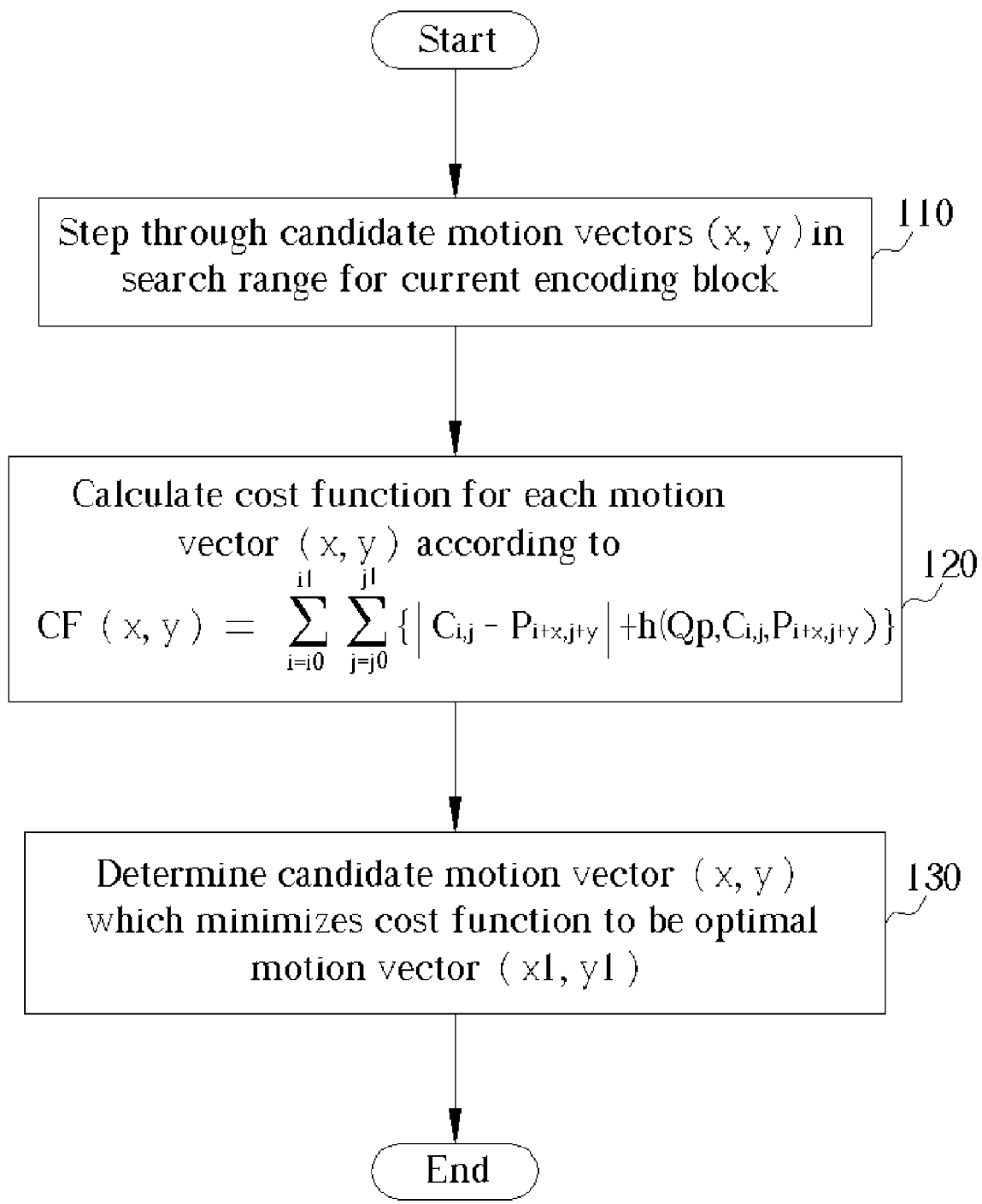
FIG. 1 illustrates a flowchart of a method according to the present invention.

Please refer to FIG. 1 showing a flowchart of a method according to the present invention. The method can be used in a video compression system for motion estimation. The video compression system divides a current picture into a plurality of blocks. The method is shown in FIG. 1 as follows:

Step 110: Step through a plurality of candidate motion vectors (x, y) in a search range for a current encoding block of a current picture. The current encoding block includes (i1−i0)*(j1−j0) pixels.

Step 120: Calculate a cost function for each candidate motion vector (x, y) as follows:

$$CF(x, y) = \sum_{i=i0}^{i1} \sum_{j=j0}^{j1} \{|C_{i,j} - P_{i+x,j+y}| + h(Qp, C_{i,j}, P_{i+x,j+y})\}$$

wherein $C_{ij}$ is a pixel in the current encoding block, $P_{i+x,j+y}$ is a pixel in the search range of the target picture, and Qp is a quantization step.

Step 130: Determine the candidate motion vector (x, y) in the search range that minimizes the cost function to be an optimal motion vector (x1, y1) of the current encoding block.

The present invention is different from the prior art because the cost function used in the present invention considers not only a sum of absolute difference (i.e. member $|C_{i,j}-P_{i+x,j+y}|$) but also other members corresponding to the quantization step Qp and the distribution of the sum of absolute difference (i.e. member $h(Qp,C_{i,j},P_{i+x,j+y})$).

For instance, function $f(Qp,C_{i,j},P_{i+x,j+y})$ can be represented as $K \times f(Qp) \times g(|C_{i,j}-P_{i+x,j+y}|)$, wherein K is a constant. Therefore, function f(Qp) is a monotonic increasing function, meaning that the larger Qp is, the larger function f(Qp) is. In this case $h(Qp,C_{i,j},P_{i+x,j+y})$ has a more important influence on the cost function. Function $g(|C_{i,j}-P_{i+x,j+y}|)$ is for roughly calculating the variation of the pixel difference between the current encoding block and a block corresponding to the current candidate motion vector (x, y) (i.e. representing the distribution of the residual in the frequency domain). Generally, the smaller $$\sum^{i1} \sum^{j1} g(|C_{i,j} - P_{i+x,j+y}|)$$

is, the better compressed the residual resulting from the candidate motion vector (x, y) and operated by DCT, quantization process, zig-zag scan (or other scan methods), and variable length coding.

Here is an example of function $g(|C_{i,j}-P_{i+x,j+y}|)$:

$$g(|C_{i,j} - P_{i+x,j+y}|) =$$
$$\begin{cases} |C_{i,j} - P_{i+x,j+y}| - \text{ad\_max}, & \text{if } |C_{i,j} - P_{i+x,j+y}| > \text{ad\_max}, (i, j) \neq (0, 0) \\ \text{ad\_min} - [|C_{i,j} - P_{i+x,j+y}|], & \text{if } |C_{i,j} - P_{i+x,j+y}| < \text{ad\_min}, (i, j) \neq (0, 0) \\ 0, & \text{else} \end{cases}$$

Wherein ad_max and ad_min are shown as follows:

$$\text{ad\_max} = \begin{cases} |C_{0,0} - P_{x,y}|, & \text{if } (i, j) = (0, 0) \\ \max[|C_{i,j} - P_{i+x,j+y}|, \text{ad\_max}], & \text{if } (i, j) \neq (0, 0) \end{cases}$$

$$\text{ad\_min} = \begin{cases} |C_{0,0} - P_{x,y}|, & \text{if } (i, j) = (0, 0) \\ \min[|C_{i,j} - P_{i+x,j+y}|, \text{ad\_min}], & \text{if } (i, j) \neq (0, 0) \end{cases}$$

In this example, whenever a function $g(|C_{i,j}-P_{i+x,j+y}|)$ corresponding to a set of (i, j) is calculated ad_max and ad_min can be refreshed for the later calculation of functions $g(|C_{i,j}-P_{i+x,j+y}|)$ corresponding to (i, j).

Take the case of a 2*3 block, (i1−i0)=2, (j1−j0)=3. Imagine if there are only two candidate motion vectors in the search range respectively corresponding to a first block and a second block, the absolute value of the pixel difference between the current encoding block and the first block {8, 9, 6, 8, 7, 6}, and the absolute value of the pixel difference between the current encoding block and the second block {5, 10, 4, 22, 0, 0}. Calculating the cost function by the sum of absolute difference according to the prior art, the cost functions of the first block and the second block are as follows:

first block: 8+9+6+8+7+6=44 second block: 5+10+4+22=41

Therefore the second block is taken as the best matching block for the current encoding block according to the prior art.

However, according to the present invention, where one assumes K=1, f(Qp)=1, the cost functions of the first block and the second block are as follows:

first block: [8+0]+[9+(9−8)]+[6+(8−6)]+[8+0]+[7+0]+[6+0]=47 second block: [5+0]+[10+(10−5)]+[4+(5−4)]+[22+(22−10)]+[0+(4−0)]+[0+0]=63

Obviously, according to the present invention, the first block is taken as the best matching block for the current encoding block. This is very different from the prior art.

According to function $g(|C_{i,j}-P_{i+x,j+y}|)$ described above, the cost function disclosed in the present invention can be simplified as follows:

$$CF(x, y) = \sum_{i=i0}^{i1} \sum_{j=j0}^{j1} |C_{i,j} - P_{i+x,j+y}| + K \cdot f(Qp) \cdot (\text{ad\_max} - \text{ad\_min})$$

Wherein ad_max and ad_min are respectively the maximum and the minimum of $|C_{i,j}-P_{i+x,j+y}|$ between $(i,j)=(i0,j0)$ and $(i,j)=(i1,j1)$.

That is, according to the present invention, the larger distribution range of the pixel difference between the current encoding block and a block corresponding to a candidate motion vector (x, y) in the target picture (in the example above, the larger the difference between the maximum and the minimum), the larger the cost function is so that it is less easier to be selected as the best matching block for the current encoding block.

Figure 2:
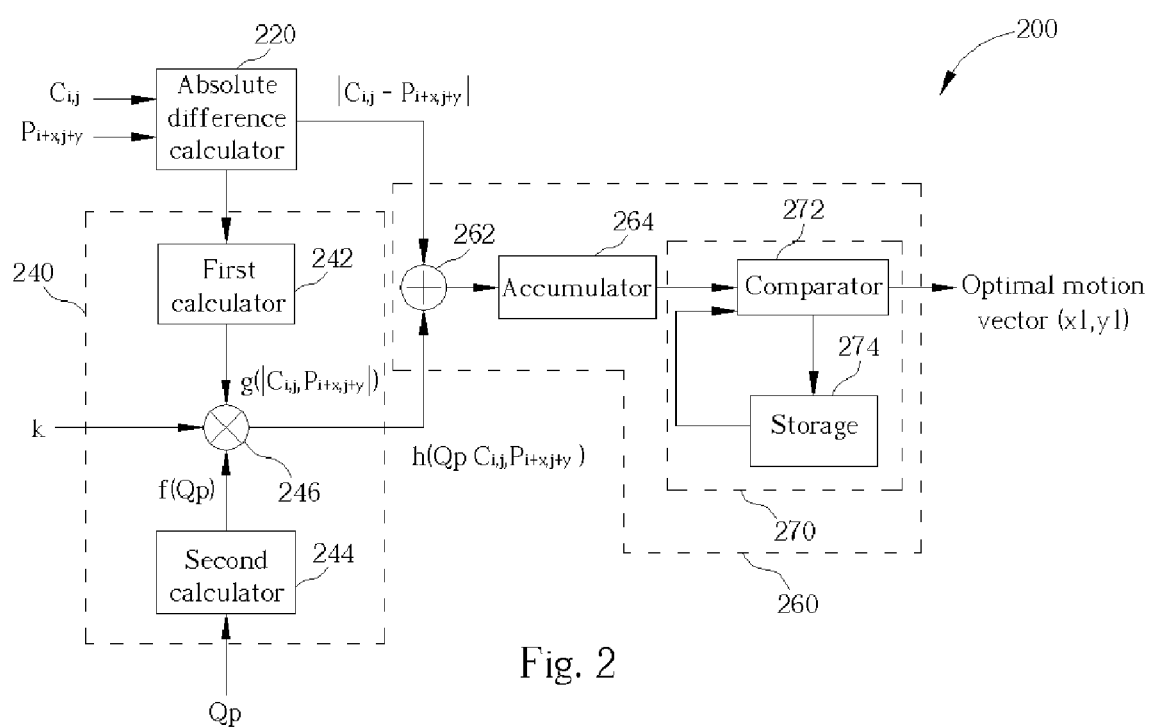
FIG. 2 illustrates a motion estimation device in the video compression system according to the present invention.

Please refer to FIG. 2 showing a motion estimation device 200 in the video compression system according to the present invention. The video compression system divides a current picture into a plurality of blocks. For a current encoding block in the current picture, the device 200 can determine an optimal motion vector (x1, y1) from a plurality of candidate motion vectors (x, y) in a search range, wherein the current encoding block includes (i1−i0)*(j1−j0) pixels. As shown in FIG. 2, the device 200 includes an absolute difference calculator 220 for calculating $|C_{i,j}-P_{i+x,j+y}|$, wherein $C_{ij}$ is a pixel in the current encoding block, and $P_{i+x,j+y}$ is a pixel in the search range of the target picture; a spatial variation calculating module 240 for calculating function $h(Qp, C_{i,j}, P_{i+x,j+y})$, wherein Qp is a quantization step, and a motion vector determining module 260 coupled with the absolute difference calculator 220 and the spatial variation calculating module 240 for calculating a cost function as follows, and also determining a candidate motion vector (x, y), which minimizes the cost function, to be an optimal motion vector (x1, y1) of the current encoding block:

$$\sum_{i=i0}^{i1} \sum_{j=j0}^{j1} \{|C_{i,j} - P_{i+x,j+y}| + h(Qp, C_{i,j}, P_{i+x,j+y})\}$$

For instance, similar to the above description, function $h(Qp, C_{i,j}, P_{i+x,j+y})$ can be represented as $K \times f(QP) \times g(|C_{i,j}-P_{i+x,j+y}|)$; therefore in device 200, the spatial variation calculating module 240 includes a first calculator 242 for calculating function $g(|C_{i,j}-P_{i+x,j+y}|)$, a second calculator 244 for calculating function $f(Qp)$, and a multiplier 246 coupled with the first calculator 242 and the second calculator 244 for calculating $K \times f(QP) \times g(|C_{i,j}-P_{i+x,j+y}|)$.

The motion vector determining module 260 includes an adder 262 coupled with the absolute difference calculator 220 and the spatial variation calculating module 240 for calculating $|C_{i,j}-P_{i+x,j+y}|+h(Qp,C_{i,j},P_{i+x,j+y})$, an accumulator 264 coupled with the adder 262 for calculating the cost function, and a determiner 270 coupled with the accumulator 246 for determining the candidate motion vector (x, y), which minimizes the cost function, to be the optimal motion vector (x1, y1) of the current encoding block.

For storing the minimum of the cost function and comparing different cost functions generated from different candidate motion vectors as shown in FIG. 2, the determiner 70 includes a comparator 272 coupled with the accumulator 264 for outputting the optimal motion vector (x1, y1), and a storage 274 coupled with the comparator 272 for storing the lowest minimum ever generated by the cost function.

In contrast to the prior art, the optimal motion vector in the search range of the current encoding block can be obtained according to a cost function different from that in the prior art. Since the cost function of the present invention is influenced by the variation of the pixel difference between the current encoding block and a block corresponding to the current candidate motion vector (x, y), the present invention can provide a better compression efficiency on the residual corresponding to the optimal motion vector after processing (by DCT, quantization process, zig-zag scan and variable length coding).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion estimation method used in a video compression system, the video compression system divides a current picture into a plurality of blocks, the method comprising:

stepping through a plurality of candidate motion vectors (x, y) in a search range for a current encoding block in the current picture, wherein the current encoding block includes (i1−i0)*(j1−j0) pixels;

calculating a cost function for each candidate motion vector (x, y) as follows, wherein Cij is a pixel in the current encoding block, Pi+x,j+y is a pixel in the search range of a target picture, and Qp is a quantization step:

$$CF(x, y) = \sum_{i=i0}^{i1} \sum_{j=j0}^{j1} \{|C_{i,j} - P_{i+x,j+y}| + h(Qp, C_{i,j}, P_{i+x,j+y})\};$$

and determining the candidate motion vector (x, y) in the search range that minimizes the cost function to be an optimal motion vector (x1, y1) of the current encoding block.

2. The method of claim 1 wherein $h(Qp,C_{i,j},P_{i+x,j+y})$ can be represented as $K \times f(Qp) \times g(|C_{i,j}-P_{i+x,j+y}|)$, K being a constant and the function f(Qp) being a monotonic increasing function.

3. The method of claim 1 wherein if other conditions do not change, the larger Qp is, the larger the function $h(Qp, C_{i,j}, P_{i+x,j+y})$ is.

4. A motion estimation device used in a video compression system, the video compression system divides a current picture into a plurality of blocks, the device stepping through a plurality of candidate motion vectors (x, y) in a search range for a current encoding block in the current picture, wherein the current encoding block includes (i1−i0)*(j1−j0) pixels, and the device comprising:

an absolute difference calculator for calculating $|C_{i,j}-P_{i+x,j+y}|$, wherein $C_{ij}$ is a pixel in the current encoding block, and $P_{i+x,j+y}$ is a pixel in the search range of a target picture;

a spatial variation calculating module for calculating function $h(Qp,C_{i,j},P_{i+x,j+y})$, wherein Qp is a quantization step; and a motion vector determining module coupled with the absolute difference calculator and the spatial variation calculating module for calculating a cost function as follows, and determining the candidate motion vector (x, y) in the search range that minimizes the cost function to be an optimal motion vector (x1, y1) of the current encoding block:

$$CF(x, y) = \sum_{i=i0}^{i1} \sum_{j=j0}^{j1} \{|C_{i,j} - P_{i+x,j+y}| + h\{Qp, C_{i,j}, P_{i+x,j+y}\}\}.$$

5. The device of claim 4 wherein $h(Qp, C_{i,j}, P_{i+x,j+y})$ can be represented as $K \times f(Qp) \times g(|C_{i,j} - P_{i+x,j+y}|)$ K being a constant, and function f(Qp) being a monotonic increasing function.

6. The device of claim 5 wherein the spatial variation calculating module comprises:
 a first calculator for calculating function $g(|C_{i,j} - P_{i+x,j+y}|)$;
 a second calculator for calculating function f(Qp); and
 a multiplier coupled with the first calculator and the second calculator for calculating $K \times f(Qp) \times g(|C_{i,j} - P_{i+x,j+y}|)$.

7. The device of claim 4 wherein the motion vector determining module comprises:
 an adder coupled with the absolute difference calculator and the spatial variation calculating module for calculating $|C_{i,j} - P_{i+x,j+y}| + h(Qp, C_{i,j}, P_{i+x,j+y})$;
 an accumulator coupled with the adder for calculating the cost function; and
 a determiner coupled with the accumulator for determining the candidate motion vector (x, y) in the search range that minimizes the cost function to be an optimal motion vector (x1, y1) of the current encoding block.

8. The device of claim 7 wherein the determiner comprises:
 a comparator coupled with the accumulator for outputting the optimal motion vector (x1, y1); and
 a storage coupled with the comparator for storing the lowest minimum of the cost function that ever appears.

9. The device of claim 4 wherein if other conditions do not change the larger Qp is, the larger the function $h(Qp, C_{i,j}, P_{i+x,j+y})$ is.

* * * * *